United States Patent
Yamazaki

(10) Patent No.: US 12,330,704 B2
(45) Date of Patent: Jun. 17, 2025

(54) SYSTEM FOR REGISTERING AN ITEM FOR PURCHASE AT A STORE

(71) Applicant: Toshiba Tec Kabushiki Kaisha, Tokyo (JP)

(72) Inventor: Shohei Yamazaki, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/486,129

(22) Filed: Oct. 12, 2023

(65) Prior Publication Data

US 2024/0336291 A1    Oct. 10, 2024

(30) Foreign Application Priority Data

Apr. 7, 2023  (JP) ................. 2023-062902

(51) Int. Cl.
| | |
|---|---|
| B62B 3/14 | (2006.01) |
| G06F 3/14 | (2006.01) |
| G06K 7/14 | (2006.01) |
| G06Q 20/20 | (2012.01) |
| G06Q 20/38 | (2012.01) |
| G06Q 30/0601 | (2023.01) |

(52) U.S. Cl.
CPC ............. *B62B 3/1424* (2013.01); *G06F 3/14* (2013.01); *G06K 7/1447* (2013.01); *G06Q 20/208* (2013.01); *G06Q 20/389* (2013.01); *G06Q 30/0641* (2013.01)

(58) Field of Classification Search
CPC ............................... B62B 3/1424; G06F 3/14
USPC .......................................................... 235/383
See application file for complete search history.

(56) References Cited

U.S. PATENT DOCUMENTS

| | | | | |
|---|---|---|---|---|
| 12,060,099 | B1* | 8/2024 | Hager ................. | G06Q 10/087 |
| 2008/0296392 | A1* | 12/2008 | Connell, II .......... | G07G 1/0081 |
| | | | | 235/375 |
| 2017/0091748 | A1* | 3/2017 | Clark .................... | G06Q 20/208 |
| 2017/0344853 | A1 | 11/2017 | Iizaka et al. | |
| 2018/0260800 | A1* | 9/2018 | Caution ................ | G06V 20/20 |
| 2022/0005327 | A1* | 1/2022 | Cleper ................ | G06K 7/1413 |
| 2023/0095037 | A1* | 3/2023 | Slaughter ............... | G06N 20/10 |
| | | | | 705/23 |
| 2023/0147176 | A1* | 5/2023 | Hagen .................... | G07G 1/12 |
| | | | | 235/383 |

(Continued)

*Primary Examiner* — Allyson N Trail

(74) *Attorney, Agent, or Firm* — Kim & Stewart LLP

(57) ABSTRACT

A system for registering an item for purchase at a store includes a terminal attachable to a shopping cart and a camera attached to the cart and positioned to capture an image of an item stored therein. The terminal includes: an interface circuit connectable to the camera, and a processor configured to: control the camera to capture an image, execute object recognition processing on the image and determine one or more candidate items using a result of the recognition processing, when only one candidate item is determined by the recognition processing, register the candidate item as an item for purchase, and when two or more candidate items are determined by the recognition processing, execute character recognition processing on the image and determine a character string in the image, and register one of the candidate items as an item for purchase using a result of the character recognition processing.

20 Claims, 6 Drawing Sheets

(56) References Cited

U.S. PATENT DOCUMENTS

| | | | |
|---|---|---|---|
| 2023/0245535 A1* | 8/2023 | Xiao | G06V 20/52 |
| | | | 382/103 |
| 2024/0144688 A1* | 5/2024 | Gao | G06Q 30/0633 |
| 2024/0242503 A1* | 7/2024 | Musiani | G07G 3/003 |
| 2024/0281817 A1* | 8/2024 | Sanzari | B62B 5/0096 |

* cited by examiner

SYSTEM FOR REGISTERING AN ITEM FOR PURCHASE AT A STORE

CROSS-REFERENCE TO RELATED APPLICATION(S)

This application is based upon and claims the benefit of priority from Japanese Patent Application No. 2023-062902, filed Apr. 7, 2023, the entire contents of which are incorporated herein by reference.

FIELD

Embodiments described herein relate generally to a system, a method, and a terminal for registering an item for purchase at a store.

BACKGROUND

An item registration system for stores has been proposed in which items placed in a shopping basket are recognized from a captured image and automatically registered for purchase. However, some items are similar in appearance, and it may be difficult to recognize such items based only on their features shown in the image.

In view of such circumstances, it is desirable to be able to accurately identify items shown in an image.

SUMMARY OF THE INVENTION

Embodiments of the present invention provide a system, a method, and a terminal capable of accurately identifying an item shown in a captured image.

In one embodiment, a system for registering an item for purchase at a store comprises a terminal attachable to a shopping cart; and a camera attached to the shopping cart and positioned to capture an image of an item stored therein. The terminal includes: an interface circuit connectable to the camera, and a processor configured to: control the camera to capture an image, execute object recognition processing on the image and determine one or more candidate items using a result of the object recognition processing, when only one candidate item is determined by the object recognition processing, register the candidate item as an item for purchase, and when two or more candidate items are determined by the object recognition processing, execute character recognition processing on the image and determine a character string shown in the image, and register one of the two or more candidate items as an item for purchase using a result of the character recognition processing.

DETAILED DESCRIPTION

Hereinafter, embodiments will be described in detail with reference to the drawings. The present invention is not limited to the embodiments described below.

Figure 1:
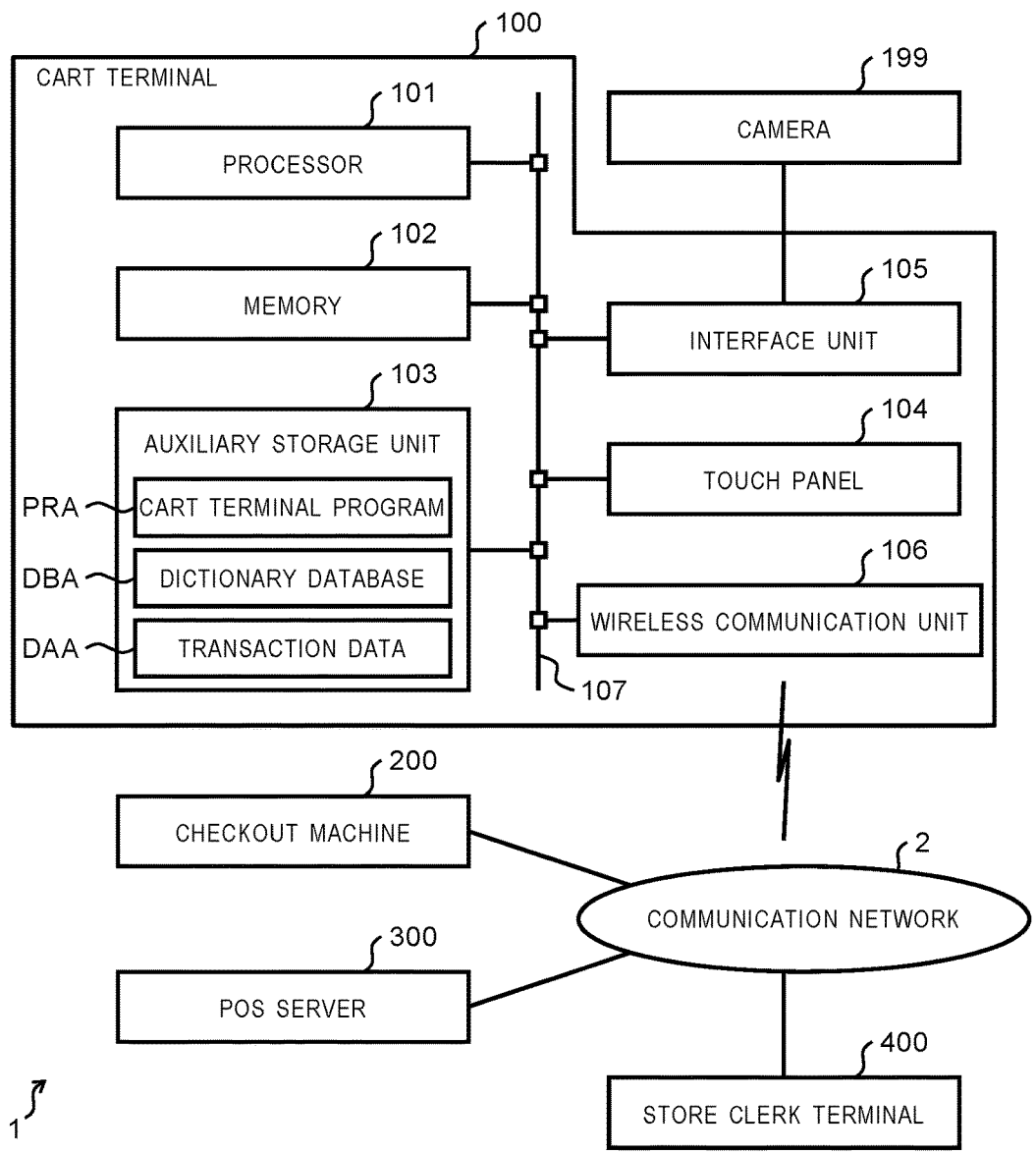
FIG. 1 is a schematic block diagram illustrating a configuration of a transaction processing system according to an embodiment.

FIG. 1 is a schematic block diagram illustrating a configuration of a transaction processing system 1 and a main circuit configuration of a cart terminal 100 according to an embodiment.

The transaction processing system 1 includes a cart terminal 100, a checkout machine 200, a POS (point of sale) server 300, and a store clerk terminal 400, which can communicate with each other via a communication network 2.

As the communication network 2, the Internet, VPN (virtual private network), a LAN (local area network), a public communication network, a mobile communication network, or the like can be used singly or in combination as appropriate. As an example of the communication network 2, the Internet and a mobile communication network are used in combination.

Any number of cart terminals 100, checkout machines 200, POS servers 300, and store clerk terminals 400 may be included in the transaction processing system 1 unlike the example illustrated in FIG. 1.

The cart terminal 100 is an information processing terminal attached to a shopping cart (hereinafter referred to as a cart) provided in a store. The cart terminal 100 is lent together with the cart to a customer who shops at a store. The cart terminal 100 is a terminal device that executes a registration processing for registering an item for which a customer is planned to purchase as an item for purchase, in response to an operation by the customer. As will be described later, the cart terminal 100 executes a process of recognizing an item to be registered as an item for purchase from an image. That is, the cart terminal 100 has a function as an item recognition apparatus. As will be described later, the cart terminal 100 executes a process of registering the recognized item as an item for purchase. That is, the cart terminal 100 also has a function as a registration system.

The checkout machine 200 is installed in a store and executes a checkout process related to payment of the price of the item for purchase registered by the cart terminal 100. The checkout machine 200 receives an operation by an operator at the time of checkout processing. The operator of the checkout machine 200 is mainly a customer. In some cases, the store clerk is an operator of the checkout machine 200.

The POS server 300 is an information processing device that executes a management process for managing a sales transaction of the item processed by the registration processing in the cart terminal 100 and the checkout process in the checkout machine 200.

The store clerk terminal 400 is an information processing terminal operated by a store clerk. The store clerk terminal 400 is a terminal device for a user interface related to information processing for assisting a store clerk's work related to a transaction processed by the transaction processing system 1. The operation of the store clerk is, for example, an operation of monitoring the execution status of the transaction being processed and appropriately assisting the customer.

The cart terminal 100 includes a processor 101, a memory 102, an auxiliary storage unit 103, a touch panel 104, an interface unit 105, a wireless communication unit 106, a transmission path 107, and the like. The processor 101, the memory 102, the auxiliary storage unit 103, the touch panel 104, the interface unit 105, and the wireless communication unit 106 can communicate with each other via the transmission path 107.

In one embodiment, the processor 101, the memory 102, and the auxiliary storage unit 103 connected via the transmission path 107 form a controller that performs information processing for controlling the cart terminal 100.

The processor 101 is a core component of the controller. The processor 101 executes information processing for controlling each unit so as to perform various functions as the cart terminal 100 in accordance with one or more programs including an operating system and application programs.

The memory 102 includes a read-only memory area and a rewritable memory area. The read-only memory area of the memory 102 stores one or more programs. In some cases, the read-only memory area and/or the rewritable memory area of the memory 102 store data necessary for the processor 101 to execute processing for controlling each unit. The rewritable memory area of the memory 102 is used as a work area by the processor 101.

The auxiliary storage unit 103 may be, for example, an EEPROM (electric erasable programmable read-only memory), an HDD (hard disc drive), an SSD (solid state drive, or any other known storage device. The auxiliary storage unit 103 stores data used by the processor 101 to perform various types of processing and data generated thereby. The auxiliary storage unit 103 may store one or more programs. In an embodiment, the auxiliary storage unit 103 stores a cart terminal program PRA. The cart terminal program PRA is an application program for performing the steps of registration processing. A part of the storage area of the auxiliary storage unit 103 is used as an area for storing a dictionary database DBA and transaction data DAA. The dictionary database DBA is a set of dictionary data which is referred to in order to identify an item shown in a captured image. The transaction data DAA is data representing the content of one transaction.

The interface unit 105 is connected to an external device such as a camera 199. The interface unit 105 interfaces data exchange with a connected external device. As the interface unit 105, a conventional USB (universal serial bus) controller or the like can be used. The camera 199 captures an image of a shooting range including the entire interior space of a shopping basket placed on a cart. Then, the camera 199 outputs image data representing the image to the cart terminal 100. Note that the camera 199 may repeat the shooting at particular intervals, or may perform the shooting in response to an instruction from the processor 101.

The wireless communication unit 106 is a network interface circuit that executes communication processing for wirelessly performing data communication via the communication network 2. As the wireless communication unit 106, for example, a conventional wireless communication device for wireless LAN can be used. In place of or in addition to the wireless communication unit 106, a communication device wired to the communication network 2 may be used.

The transmission path 107 includes an address bus, a data bus, a control signal line, and the like, and conveys data and control signals transmitted and received between the connected components.

As the hardware of the cart terminal 100, for example, a tablet-type information processing apparatus can be used.

Figure 2:
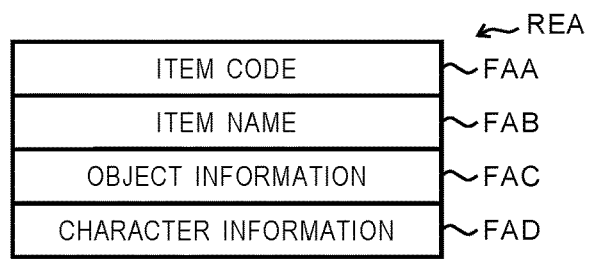
FIG. 2 depicts a data structure of data records included in a dictionary database of FIG. 1.

FIG. 2 depicts a data structure of a data record REA included in the dictionary database DBA.

The dictionary database DBA is a set of data records REA each associated with an item sold in a store in which the cart terminal 100 is used. The data record REA includes fields FAA, FAB, FAC, and FAD. An item code as an identifier of the associated item is set in the field FAA. The item name of the associated item is set in the field FAB. In the field FAC, object information including a plurality of feature points to be referred to in order to recognize the associated item by object recognition processing to be described later is set. In the field FAD, character information including a plurality of character string information each representing a plurality of character strings printed on the associated item is set.

The dictionary database DBA is set up by an appropriate worker in view of items sold at a store, for example, when the transaction processing system 1 is introduced to the store, and is stored in the auxiliary storage unit 103 of the cart terminal 100 used in the store. The dictionary database DBA may be appropriately updated by the operator or the like at the time of an appropriate maintenance operation even after the use of the transaction processing system 1 is started.

Figure 3:
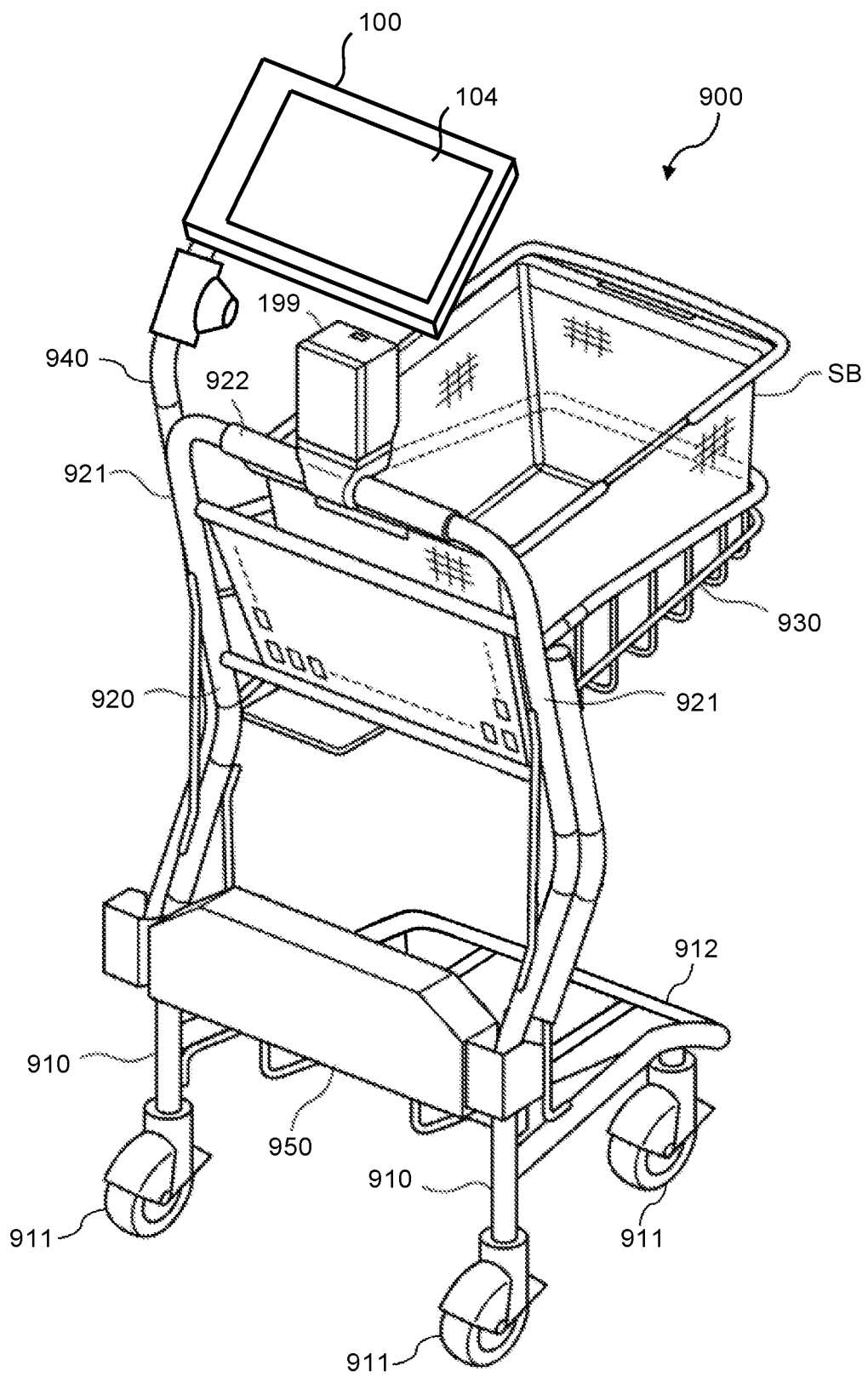
FIG. 3 is a perspective view illustrating a cart terminal of FIG. 1 attached to a cart.

FIG. 3 is a perspective view illustrating the cart terminal 100 attached to a cart 900. The cart 900 includes a caster unit 910, a handle frame unit 920, and a basket receiving unit 930. The caster unit 910 has four wheels 911 for smoothly moving the cart 900 on a sales floor. The wheels 911 are attached to a frame 912 to be rotatable about a vertical axis.

The handle frame unit 920 includes a pair of vertical frames 921 and a handlebar 922. The vertical frames 921 are erected above two wheels of the caster unit 910. The handlebar 922 connects the upper ends of the vertical frames 921.

The basket receiving unit 930 is attached to an intermediate portion of the handle frame unit 920. The basket receiving unit 930 holds a shopping basket SB as a container for storing items. The caster unit 910 can also hold a shopping basket SB on the frame 912.

A customers using the cart 900 is typically located on the front side of the handle frame unit 920 in FIG. 3. The customer then pushes the cart 900 while grasping the handlebar 922. That is, in this case, the direction in which the basket receiving unit 930 protrudes with respect to the handle frame unit 920 is the forward direction of the cart 900.

The camera 199 is attached to an intermediate portion of the handlebar 922 so that the inside of the shopping basket SB held by the basket receiving unit 930 can be photographed in a bird's-eye view from above. Further, a pole 940 is attached to one of the vertical frames 921 so that the distal end thereof is positioned above the handlebar 922. The above-described cart terminal 100 is attached to the distal end portion of the pole 940 in a posture in which the touch panel 104 faces the opposite side in the forward direction.

A battery case 950 is mounted between the vertical frames 921 on the lower end side of the handle frame unit 920. The battery case 950 houses a battery used as an external power source of the cart terminal 100.

Next, the operation of the transaction processing system 1 configured as described above will be described. Note that the steps described below are examples, and the order of some of the steps may be changed, some of the steps may be omitted, or other steps may be added as appropriate. For example, in the following description, descriptions of some steps are omitted in order to explain characteristic operations of the present embodiment in an easy-to-understand manner. For example, in a case where some kind of error occurs, steps for coping with the error may be performed, but descriptions for such steps are omitted.

The customer performs a predetermined operation for starting use at the cart terminal 100 that is in an unused state. When this operation is performed, the processor 101 starts registration processing based on the cart terminal program PRA.

Figure 4:
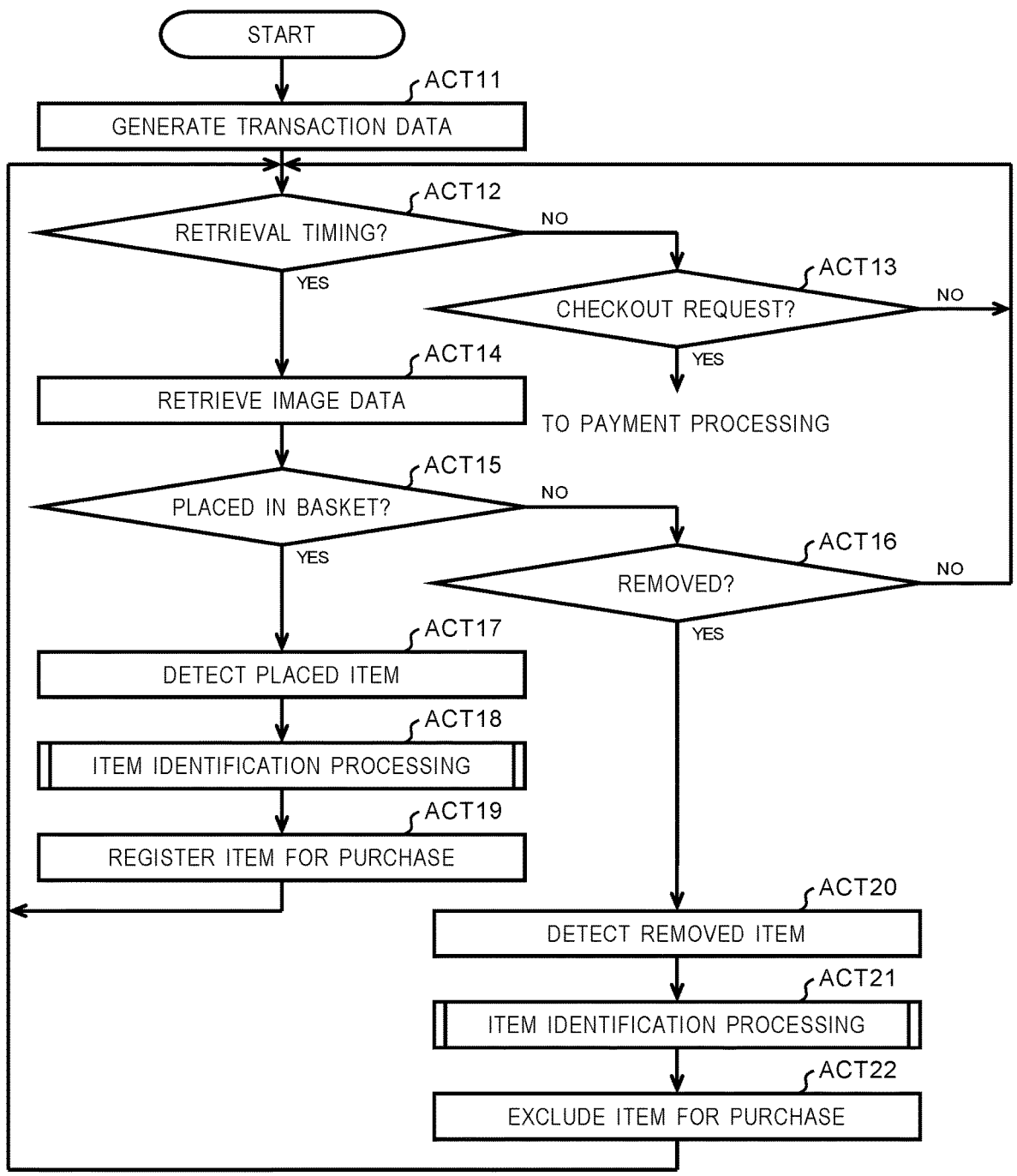
FIG. 4 is a flowchart of registration processing.

FIG. 4 is a flowchart of the registration processing.

In ACT11, the processor 101 generates new transaction data DAA for a transaction. That is, the processor 101 determines, for example, a new transaction code different from the transaction codes for identifying the other existing transactions according to a predetermined rule, generates new transaction data DAA including the new transaction code and not including any item information, and stores the new transaction data DAA in the auxiliary storage unit 103.

In ACT12, the processor 101 checks whether it is a retrieval timing. The processor 101 determines NO if the corresponding event cannot be confirmed, and proceeds to ACT13. Note that the retrieval timing may be, for example, a timing immediately after proceeding from ACT11 to ACT12 and a timing at every predetermined time interval thereafter, and may be appropriately determined by, for example, a provider of the cart terminal program PRA.

In ACT13, the processor 101 checks whether a checkout has been requested. The processor 101 then determines NO if the event cannot be ascertained and returns to ACT12.

Thus, the processor 101 waits a retrieval timing or a checkout request in ACT12 and ACT13.

The processor 101 determines YES in ACT12 at the retrieval timing, and proceeds to ACT14.

In ACT14, the processor 101 retrieves image data output by the camera 199. For example, if the camera 199 repeats shooting at predetermined intervals, the processor 101 retrieves image data that is output in accordance with the shooting most recently performed by the camera 199. For example, if the camera 199 captures an image in response to an instruction from the processor 101, the processor 101 instructs the camera 199 to capture an image, and in response, the camera 199 captures an image and acquires image data to be output. The processor 101 stores the retrieved image data in the memory 102 or the auxiliary storage unit 103.

In ACT15, the processor 101 checks whether an item has been placed in the shopping basket SB. The processor 101 determines NO if the corresponding event cannot be confirmed, and proceeds to ACT16.

In ACT16, the processor 101 checks whether an item has been removed from the shopping basket SB. The processor 101 then determines NO if the event cannot be ascertained and returns to the standby status in ACT12 and ACT13.

If the timing immediately after the advance from ACT11 to ACT12 is the first retrieval timing, an item other than the shopping basket SB is not shown in the image represented by the image data retrieved by the first execution of ACT14. Therefore, when the processor 101 executes ACT15 and ACT16 for the first time, it determines that both ACT15 and ACT16 are NO and returns to the standby status of ACT12 and ACT13. Then, the processor 101 repeats ACT14 every retrieval timing. At this time, the processor 101 leaves the image data retrieved by the execution of ACT 14 in the past predetermined period and already stored in the memory 102 or auxiliary storage unit 103 (hereafter referred to as past data) in the memory 102 or auxiliary storage unit 103 as it is.

The customer searches for a transaction target item on the sales floor of the store. Then, the customer takes out an item to be purchased and puts the item into the shopping basket SB.

For example, the processor 101 checks whether any item is newly placed in the shopping basket SB on the basis of a difference between image data newly acquired in ACT14 (hereinafter, referred to as current data) and past data. The processor 101 may monitor movement of the customer's hand holding some item on the basis of the current data and the plurality of past data, and determine that the item has been placed in the basket based on the result. If the processor 101 determines that any item is newly placed in the shopping basket SB, it determines YES in ACT15 and proceeds to ACT17.

In ACT17, the processor 101 detects an item that has been put into the shopping basket this time (hereinafter, referred to as a "placed item"). For example, the processor 101 detects a placed item that is not shown in an image represented by the past data but is shown in an image represented by the current data by comparing those images. As a method of the process, a well-known method such as deep learning using CNN (convolutional neural network), for example, can be used.

In ACT18, the processor 101 executes item identification processing for identifying the placed item detected in ACT17.

Figure 5:
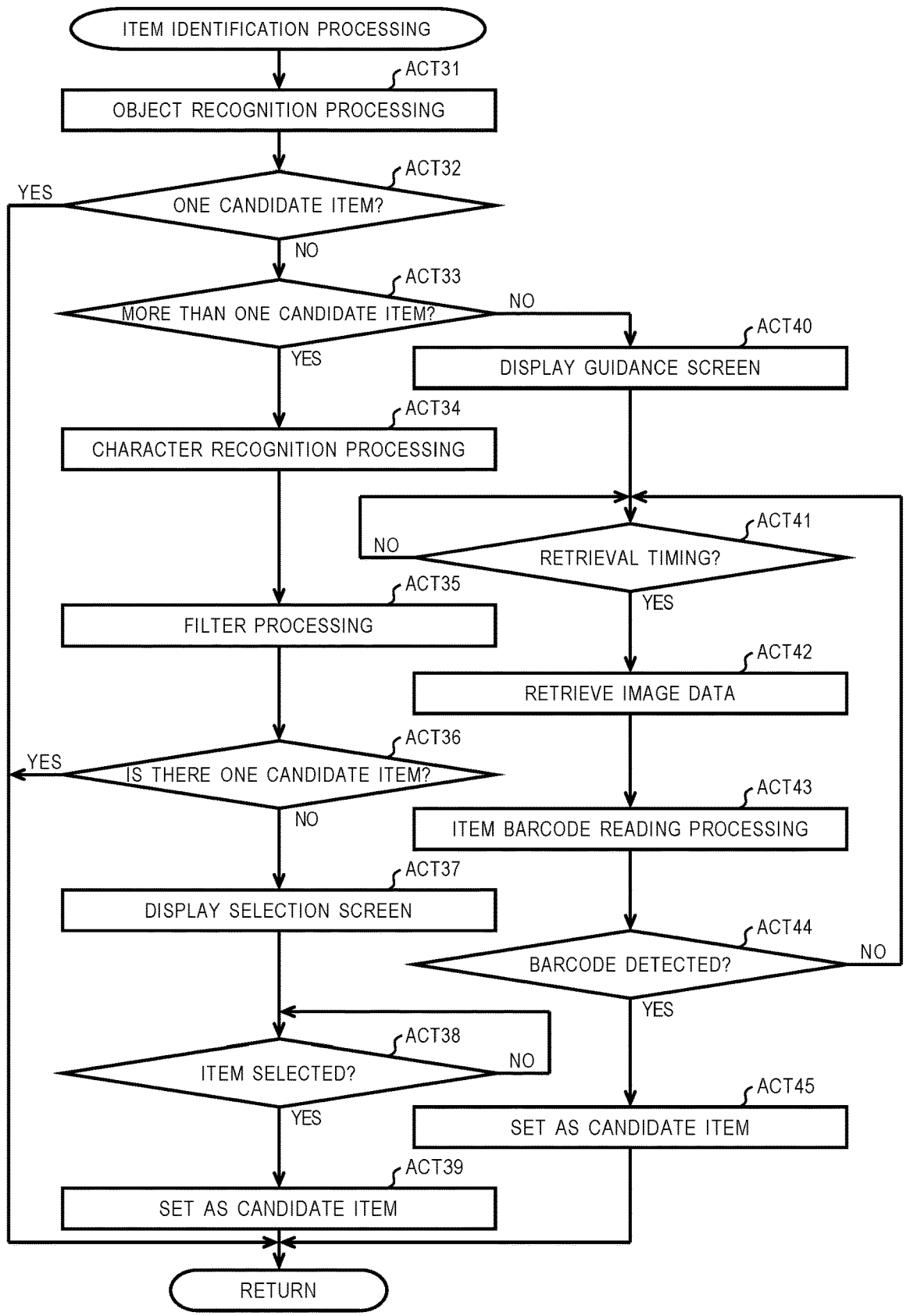
FIG. 5 is a flowchart of item identification processing.

FIG. 5 is a flowchart of the item identification processing.

In ACT31, the processor 101 performs object recognition processing on the item detected in ACT17. The object recognition processing selects, as a candidate item, an item that is considered to coincide with the placed item by comparing the features or feature points of the appearance of the placed item shown in the image represented by the current data with the feature points represented by the object information included in the respective data record REA of the dictionary database DBA. In this object recognition processing, one or a plurality of candidate items may be selected. Also, in the object recognition processing, no candidate item may be selected in some cases. As a method of image identification in such object recognition processing, for example, a well-known method such as feature point matching can be used. In addition, as a method of selecting a candidate item according to the outcome of the image-identification, a well-known method such as deep learning using the CNN can be used.

In ACT32, the processor 101 checks whether there is one candidate item selected in ACT31. Then, if a plurality of candidate items are selected in ACT31 or no candidate item can be selected, the processor 101 determines that the candidate item is not one and determines NO, and proceeds to ACT33.

In ACT33, the processor 101 checks whether there are a plurality of candidate items selected in ACT31. The processor 101 determines YES if a plurality of candidate items are selected in ACT31, and proceeds to ACT34.

In ACT34, the processor 101 performs character recognition processing on the placed item as a target. That is, the processor 101 recognizes a character string shown in the image of the placed item. As a specific method of the character recognition processing, for example, a well-known method such as deep learning using the CNN can be used.

In ACT35, the processor 101 narrows down a plurality of candidate items selected in ACT31 based on a result of the character recognition processing performed in ACT34. For example, the processor 101 finds a data record REA associated with each of the plurality of candidate items in the dictionary database DBA. Then, for example, the processor 101 selects, from the corresponding data record REA, the data record REA in which any one of the character strings represented by the character string included in the character information set in the field FAD matches the character string recognized by the character recognition processing in ACT34, and sets the item associated with the data record REA as a candidate item after narrowing down. If the characters included in the character information set in the field FAD of each data recode REA do not match the characters recognized by the character recognition processing in ACT34, the processor 101 may select the item associated with the data record REA having a greatest or greater number of matches as the candidate item.

Figure 6:
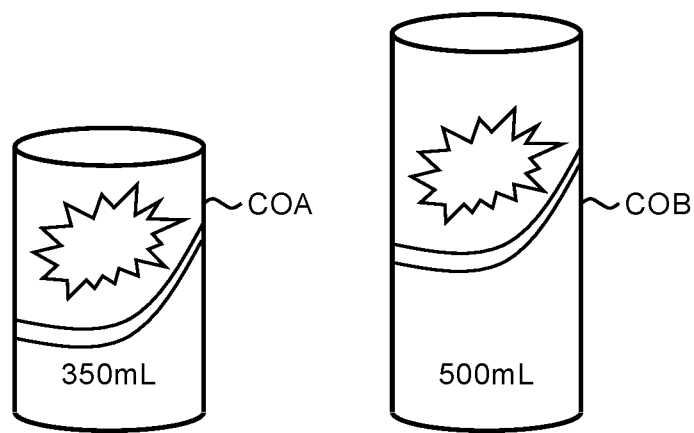
FIG. 6 is a diagram of items to be narrowed down by character strings.

FIG. 6 is a diagram illustrating items to be narrowed down by character strings.

For example, as shown in FIG. 6, two items COA and COB of the same brand with different sizes are sold at a store. Different items of the same brand have a common package design as in the example shown in FIG. 6, and may not be identified in object recognition processing. That is, in the object recognition processing when the item COA illustrated in FIG. 6 is placed in the shopping basket SB, any of the items COA and COB can be set as a candidate item. In such a case, for example, when the character string "350 mL" can be recognized from the image of the placed items by character recognizing processing, the candidate items are narrowed down to the item COA. However, the character string "350 mL" represented in the placed item may not be shown in the images when that character string is hidden by the hand of the customer, the candidate items cannot be narrowed down.

In ACT36, the processor 101 checks whether there is one candidate item after narrowing down in ACT35. Then, the processor 101 determines NO if the candidate items have not been narrowed down to one, and proceeds to ACT37.

In ACT37, the processor 101 controls the touch panel 104 to display a selection screen. The selection screen is a GUI (graphical user interface) screen for allowing a customer to select one of the plurality of candidate items.

Figure 7:
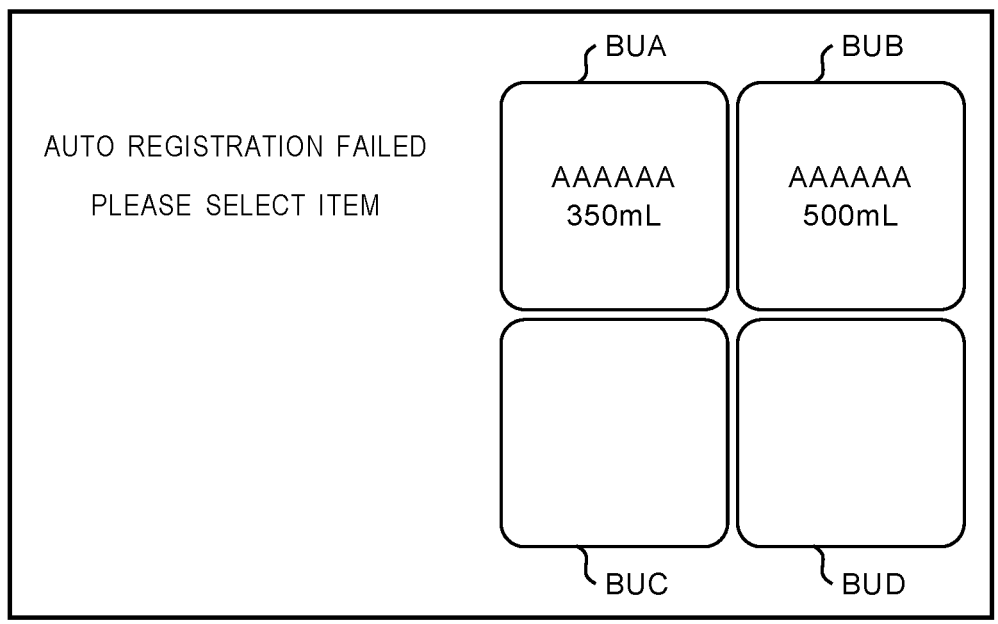
FIG. 7 is a diagram of a selection screen.

FIG. 7 is a diagram illustrating an example of a selection screen.

The selection screen illustrated in FIG. 7 is an exemplary screen in which the two items COA and COB illustrated in FIG. 6 are candidate items.

The selection screen includes four buttons BUA, BUB, BUC, and BUD for candidate items. In FIG. 7, the items COA and COB are assigned to the buttons BUA and BUB respectively. The buttons BUA, BUB, BUC, and BUD are soft keys for the customer to designate one of the assigned items.

When such a selection screen is displayed, the customer designates one of the candidate items by tapping on a button to which the item placed in the shopping basket SB is assigned.

The processor 101 proceeds to ACT38 in FIG. 5 with the selection screen displayed. In ACT38, the processor 101 waits for one of the candidate items to be designated. Then, if the item is designated by the above-described operation, the processor 101 determines YES, and proceeds to ACT39.

In ACT39, the processor 101 sets only the designated item as the candidate item.

That is, the processor 101 accepts the operation of designating one of the plurality of candidate items on the selection screen.

On the other hand, if no candidate item can be selected by object recognition processing in ACT31, the processor 101 determines NO in ACT33 and proceeds to ACT40.

In ACT40, the processor 101 controls the touch panel 104 to display a guidance screen. The guidance screen is a screen for guiding a customer to scan a barcode attached to the item that has just been placed in the shopping basket SB (hereinafter, referred to as an item barcode) with the camera 199.

Figure 8:
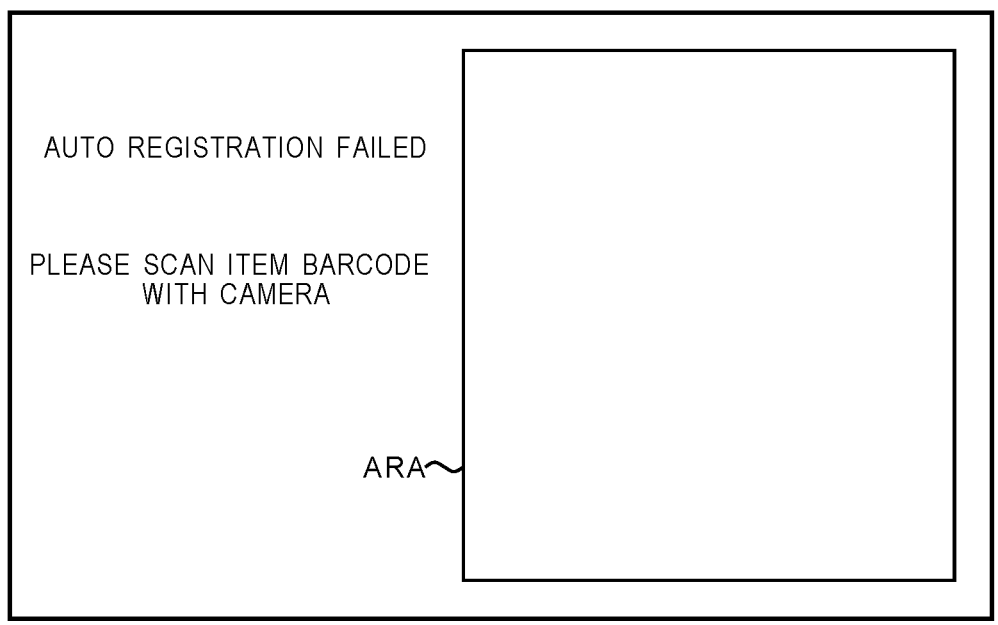
FIG. 8 is a diagram of a guidance screen.

FIG. 8 is a diagram of a guidance screen.

The guidance screen shown in FIG. 8 includes an area ARA. The processor 101 acquires image data output by the camera 199 and controls the touch panel 104 to display the image represented by the image data in the area ARA.

The processor 101 proceeds to ACT41 in FIG. 5 with the guidance screen displayed.

In ACT41, the processor 101 waits for the retrieval timing of images. Then, the processor 101 determines YES at the retrieval timing, and proceeds to ACT42. It is assumed that the retrieval timing is, for example, a timing for each predetermined time interval, and may be appropriately determined by, for example, a provider of the cart terminal program PRA.

In ACT42, the processor 101 acquires image data output by the camera 199. At this time, the processor 101 controls the touch panel 104 to display the image represented by the newly retrieved image data on the area ARA. This makes it easy for the customer to scan an item barcode with the camera 199 while confirming that the barcode is reflected in the image displayed on the area ARA.

In ACT43, the processor 101 performs item barcode reading processing on the image data acquired in ACT42. That is, the processor 101 attempts to detect and read an item barcode in the image represented by the image data acquired in ACT42.

In ACT44, the processor 101 checks whether any item barcode has been detected and read in ACT43. The processor 101 cannot detect any item barcode in ACT43 when an item is not properly scanned with the camera 199 so that the item barcode is reflected. In such cases, the processor 101 determines NO in ACT44, returns to ACT41 standby status, and repeats ACT41 to ACT44 until the item barcode can be extracted in ACT43. Then, if an item barcode can be detected in ACT43, the processor 101 determines YES in ACT44 and proceeds to ACT45.

In ACT45, the processor 101 sets an item identified by the item code represented by the extracted item barcode as a candidate item.

When the processor 101 finishes setting one item as the candidate item in ACT39 or ACT45 as described above, the item identification processing ends. If there is only one candidate item selected in ACT31, the processor 101 determines YES in ACT32, passes the processing after ACT33, and ends the item identification processing as it is. The processor 101 determines YES in ACT36 if there is only one candidate item after narrowing down in ACT35, passes the processing after ACT37, and ends the item identification processing as it is. That is, the processor 101 terminates the item identification processing in a state where only one candidate item is specified. When the processor 101 finishes the item identification processing In ACT18 of FIG. 4 in this way, it proceeds to ACT19.

As described above, when ACT35 has been performed, the processor 101 identifies an item as one of the candidate items narrowed down based on the characters recognized by character recognition processing.

In ACT19, the processor 101 registers one candidate item specified by the item identification processing as an item for purchase. That is, for example, the processor 101 updates the transaction data so as to include the item code of the one candidate item specified by the item identification processing as the item code of the item for purchase. The processor 101 then returns to the standby status in ACT12 and ACT13.

Once the customer changed their mind and decided not to purchase an item placed in the shopping basket SB, the customer removes the item from the shopping basket SB and returns the item to the store counter.

For example, the processor 101 checks whether an item has been removed from the shopping basket SB on the basis of a difference between the current data and the past data newly acquired in ACT14. The processor 101 may monitor the movement of the customer's hand holding an item on the basis of the current data and the plurality of past data, and determine that an item has been removed based on the result. Then, if the processor 101 determines that an item has been removed, it determines YES in ACT16 and proceeds to ACT20.

In ACT20, the processor 101 detects an item (hereinafter, referred to as a removed item) extracted from the shopping basket SB. For example, the processor 101 detects an extracted item which is shown in an image represented by the past data and is not shown in an image represented by the current data by comparing those images. As a method of the process, for example, a well-known method such as deep learning using CNN can be used.

In ACT21, the processor 101 executes item identification processing for specifying which item has been removed. Here, the item identification processing is the process illustrated in FIG. 5 as in ACT18.

In ACT22, the processor 101 excludes one candidate item identified by the item identification processing from the registered items for purchase. That is, for example, the processor 101 updates the transaction data so as to reduce the quantity related to the item code of one candidate item identified by the item identification processing by one. The processor 101 then returns to the standby status in ACT12 and ACT13.

Upon completion of the registration of the item for purchase, the customer performs a predetermined operation for instructing the start of checkout processing, for example, on the touch panel 104. In response, the processor 101 determines YES in ACT13 and proceeds to the checkout processing. The checkout processing may be similar to checkout processing performed by conventional cart POS systems. The illustration thereof is omitted. For example, the processor 101 performs processing for transferring transaction data to the checkout machine 200 as checkout processing. Alternatively, if a payment terminal (not shown) is attached to the cart 900 and the payment terminal is connected to the cart terminal 100, processing for performing credit payment, barcode payment, or the like using the payment terminal may be performed as checkout processing.

As described above, when candidate items cannot be narrowed down to one by object recognition processing, the cart terminal 100 narrows down the candidate items based on the characters recognized by character recognition processing, and identifies the item included in the shopping basket SB as one of the candidate items narrowed down in this way. As a result, an item placed in the shopping basket SB and shown in a captured image can be accurately identified.

In addition, the cart terminal 100 identifies an item included in the shopping basket SB as one of the plurality of candidate items in accordance with the instruction of the customer made on the selection screen, so that the item included in the shopping basket SB can be identified even when the candidate items cannot be narrowed down to one using character recognition processing. In this case, a designation operation by the customer is required, but since the number of candidate items can be reduced by narrowing down the number of candidate items based on characters, a burden on the customer for designating one of the candidate items is small.

In addition, when one or more candidate items cannot be identified by object recognition processing, the cart terminal 100 identifies the item placed in the shopping basket SB based on its barcode. Accordingly, even if the object recognition fails, the item placed in the shopping basket SB can be identified.

Further, the cart terminal 100 registers, as an item for purchase, the item identified as being placed in the shopping basket SB. Thus, the transaction processing system 1 has a function as a registration system capable of recognizing an item placed in a shopping basket by a customer at a store from an image obtained by photographing the shopping basket and automatically registering the item as an item for purchase with high accuracy.

Various modifications can be made to this embodiment as follows.

It is also possible to recognize an object other than an item sold in a store.

The recognition result of the item is not limited to item registration in sales transactions, and may be used for any purpose.

A part of the processing executed by the processor 101 in the above-described embodiment may be executed by the POS server 300 or any one or a plurality of other information processing apparatuses. For example, the cart terminal 100 may perform only a user interface operation, and various information processing for specifying an item for purchase may be executed by a computer provided in the POS server 300. In other words, each of the above-described steps may be performed by any information processing device other than the cart terminal 100 included in the transaction processing system 1, or may be performed by a number of information processing devices included in the transaction processing system 1 as appropriate and dispersed.

Each of the functions performed by the processor 101 by the information processing may be performed by hardware that executes information processing that is not based on a program such as a logic circuit or the like. Each of the above-described functions can also be performed by a combination of software and hardware such as the above-described logic circuit.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A system for registering an item for purchase at a store, comprising:
   a terminal attachable to a shopping cart; and
   a camera attached to the shopping cart and positioned to capture an image of an item stored therein, wherein the terminal includes:

an interface circuit connectable to the camera, and
a processor configured to:
: control the camera to capture an image,
: execute object recognition processing on the image and determine one or more candidate items and a quantity thereof using a result of the object recognition processing,
: in response to determining that the quantity of the candidate items is one, register the candidate item as an item for purchase, and
: in response to determining that the quantity of the candidate items is two or more,
:: execute character recognition processing on the image on which the object recognition processing was performed and determine a character string shown in the image, and
:: register one of the two or more candidate items as an item for purchase using a result of the character recognition processing.

2. The system according to claim 1, wherein
the terminal includes a memory that stores a plurality of pieces of item information each associating an item sold at the store with a character string, and
the processor is configured to, after executing the character recognition processing:
: search the memory for one or more of the plurality of pieces of item information corresponding to the character string shown in the image, and
: when one piece of item information is found by the search, register an item corresponding to said one piece of item information.

3. The system according to claim 2, wherein
the terminal includes a display, and
the processor is configured to:
: when two or more pieces of item information are found by the search, control the display to display a screen including two or more selectable objects corresponding to said two or more pieces of item information, and
: upon selection of one of the selectable objects, register an item corresponding to the selected object.

4. The system according to claim 1, wherein
the processor is configured to, in response to determining that the quantity of the candidate items is zero:
: control the camera to capture another image,
: execute barcode reading processing on said another image, and
: register an item corresponding to a barcode read from said another image by the barcode reading processing.

5. The system according to claim 4, wherein
the terminal includes a display, and
the processor is configured to, before controlling the camera to capture another image, control the display to display a guidance message for the barcode reading processing.

6. The system according to claim 1, wherein
the terminal includes a memory, and
the processor is configured to generate transaction data indicating the registered item and store the transaction data in the memory.

7. The system according to claim 6, further comprising:
a checkout machine configured to perform checkout processing, wherein
the terminal includes a network interface configured to communicate with the checkout machine, and
the processor is configured to control the network interface to transmit the transaction data to the checkout machine.

8. A method for registering an item for purchase at a store, the method comprising:
: capturing an image using a camera attached to a shopping cart and positioned to capture an image of an item stored therein;
: executing object recognition processing on the image and determining one or more candidate items and a quantity thereof using a result of the object recognition processing;
: in response to determining that the quantity of the candidate items is one, registering the candidate item as an item for purchase; and
: in response to determining that the quantity of the candidate items is two or more,
:: executing character recognition processing on the image on which the object recognition processing was performed and determining a character string shown in the image, and
:: registering one of the two or more candidate items as an item for purchase using a result of the character recognition processing.

9. The method according to claim 8, further comprising:
storing, in a memory, a plurality of pieces of item information each associating an item sold at the store with a character string; and
after executing the character recognition processing:
: searching the memory for one or more of the plurality of pieces of item information corresponding to the character string shown in the image, and
: when one piece of item information is found by the search, registering an item corresponding to said one piece of item information.

10. The method according to claim 9, further comprising:
when two or more pieces of item information are found by the search, displaying a screen including two or more selectable objects corresponding to said two or more pieces of item information; and
upon selection of one of the selectable objects, registering an item corresponding to the selected object.

11. The method according to claim 8, further comprising:
in response to determining that the quantity of the candidate items is zero:
: capturing another image using the camera,
: executing barcode reading processing on said another image, and
: registering an item corresponding to a barcode read from said another image by the barcode reading processing.

12. The method according to claim 11, further comprising:
before controlling the camera to capture another image, displaying a guidance message for the barcode reading processing.

13. The method according to claim 8, further comprising:
generating transaction data indicating the registered item and storing the transaction data in a memory.

14. The method according to claim 13, further comprising:
transmitting the transaction data to a checkout machine for executing checkout processing.

15. A terminal attachable to a shopping cart for registering an item for purchase at a store, comprising:

an interface circuit connectable to a camera attached to the shopping cart and positioned to capture an image of an item stored therein; and a processor configured to:
- control the camera to capture an image,
- execute object recognition processing on the image and determine one or more candidate items and a quantity thereof using a result of the object recognition processing,
- in response to determining that the quantity of the candidate items is one, register the candidate item as an item for purchase, and
- in response to determining that the quantity of the candidate items is two or more,
  - execute character recognition processing on the image on which the object recognition processing was performed and determine a character string shown in the image, and
  - register one of the two or more candidate items as an item for purchase using a result of the character recognition processing.

16. The terminal according to claim 15, further comprising:
a memory that stores a plurality of pieces of item information each associating an item sold at the store with a character string, wherein
the processor is configured to, after executing the character recognition processing:
- search the memory for one or more of the plurality of pieces of item information corresponding to the character string shown in the image, and
- when one piece of item information is found by the search, register an item corresponding to said one piece of item information.

17. The terminal according to claim 16, further comprising:
a display, wherein
the processor is configured to:
- when two or more pieces of item information are found by the search, control the display to display a screen including two or more selectable objects corresponding to said two or more pieces of item information, and
- upon selection of one of the selectable objects, register an item corresponding to the selected object.

18. The terminal according to claim 15, wherein
the processor is configured to, in response to determining that the quantity of the candidate items is zero:
- control the camera to capture another image,
- execute barcode reading processing on said another image, and
- register an item corresponding to a barcode read from said another image by the barcode reading processing.

19. The terminal according to claim 18, further comprising:
a display, wherein
the processor is configured to, before controlling the camera to capture another image, control the display to display a guidance message for the barcode reading processing.

20. The terminal according to claim 15, further comprising:
a memory, wherein
the processor is configured to generate transaction data indicating the registered item and store the transaction data in the memory.

* * * * *